United States Patent
Moon et al.

(10) Patent No.: US 12,025,472 B2
(45) Date of Patent: Jul. 2, 2024

(54) APPARATUS AND METHOD FOR ESTIMATING VEHICLE PITCH RELATIVE TO ROAD

(71) Applicants: HYUNDAI MOBIS CO., LTD., Seoul (KR); KONKUK UNIVERSITY INDUSTRIAL COOPERATION CORP., Seoul (KR)

(72) Inventors: In Sub Moon, Yongin-si (KR); Jong Hwa Kim, Yongin-si (KR); Kun Ho Lee, Yongin-si (KR); Ji Sung Kang, Yongin-si (KR); Ki Chun Jo, Seoul (KR); Chan Soo Kim, Seoul (KR); Ji Won Seok, Seoul (KR)

(73) Assignees: HYUNDAI MOBIS CO., LTD., Seoul (KR); KONKUK UNIVERSITY INDUSTRIAL COOPERATION CORP., Seoul (KR)

( * ) Notice: Subject to any disclaimer, the term of this patent is extended or adjusted under 35 U.S.C. 154(b) by 0 days.

(21) Appl. No.: 18/057,174

(22) Filed: Nov. 18, 2022

(65) Prior Publication Data
US 2023/0384088 A1 Nov. 30, 2023

(30) Foreign Application Priority Data
May 30, 2022 (KR) ........................ 10-2022-0066017

(51) Int. Cl.
*G01C 9/00* (2006.01)
(52) U.S. Cl.
CPC ...................... *G01C 9/00* (2013.01)
(58) Field of Classification Search
CPC ....................................................... G01C 9/00

USPC .......................................................... 702/154
See application file for complete search history.

(56) References Cited

U.S. PATENT DOCUMENTS

| 10,300,839 | B2* | 5/2019 | Nakamura | ............ F21S 41/657 |
| 2017/0043703 | A1 | 2/2017 | Mizuno | |
| 2021/0139028 | A1* | 5/2021 | Zhou | ................. B60W 30/143 |
| 2021/0197778 | A1* | 7/2021 | Shi | ........................ B60T 8/1761 |
| 2021/0214001 | A1* | 7/2021 | Solomon | ............... B62D 7/159 |

FOREIGN PATENT DOCUMENTS

| DE | 10 2016 110461 | 12/2017 |
| JP | 3 375268 | 2/2003 |
| KR | 10-2018-0038154 | 4/2018 |
| KR | 10-1977749 | 8/2019 |

OTHER PUBLICATIONS

Korean Office Action dated Jue 29, 2023 issued in KR 10-2022-0066017.
Extended European Search issued in EP 22207438.7 dated Nov. 2, 2023.

* cited by examiner

*Primary Examiner* — Aditya S Bhat
(74) *Attorney, Agent, or Firm* — DLA Piper LLP US

(57) ABSTRACT

An apparatus and method for estimating a vehicle pitch relative to a road. The apparatus includes a wheel speed sensor part which obtains wheel speed data, an inertial measurement unit (IMU) sensor part which obtains IMU data, a preprocessing part which extracts a stop section and a moving section on the basis of the wheel speed data and the IMU data, and a slope estimation part which estimates a vehicle pitch in the stop section and a road slope in the moving section and estimates a vehicle pitch relative to a road on the basis of the vehicle pitch and the road slope.

18 Claims, 15 Drawing Sheets

Body (b) frame

*Road (r) frame*

Navigation (n) *frame*

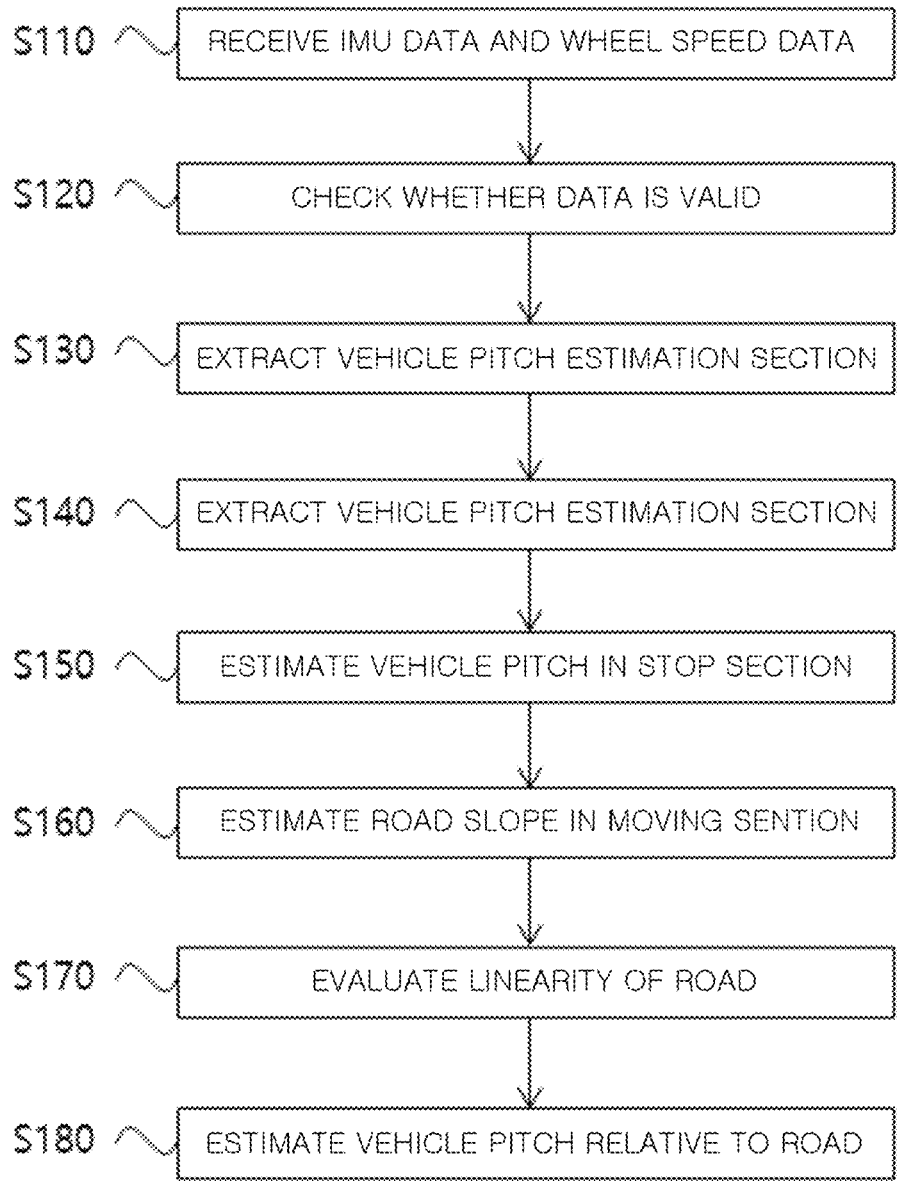

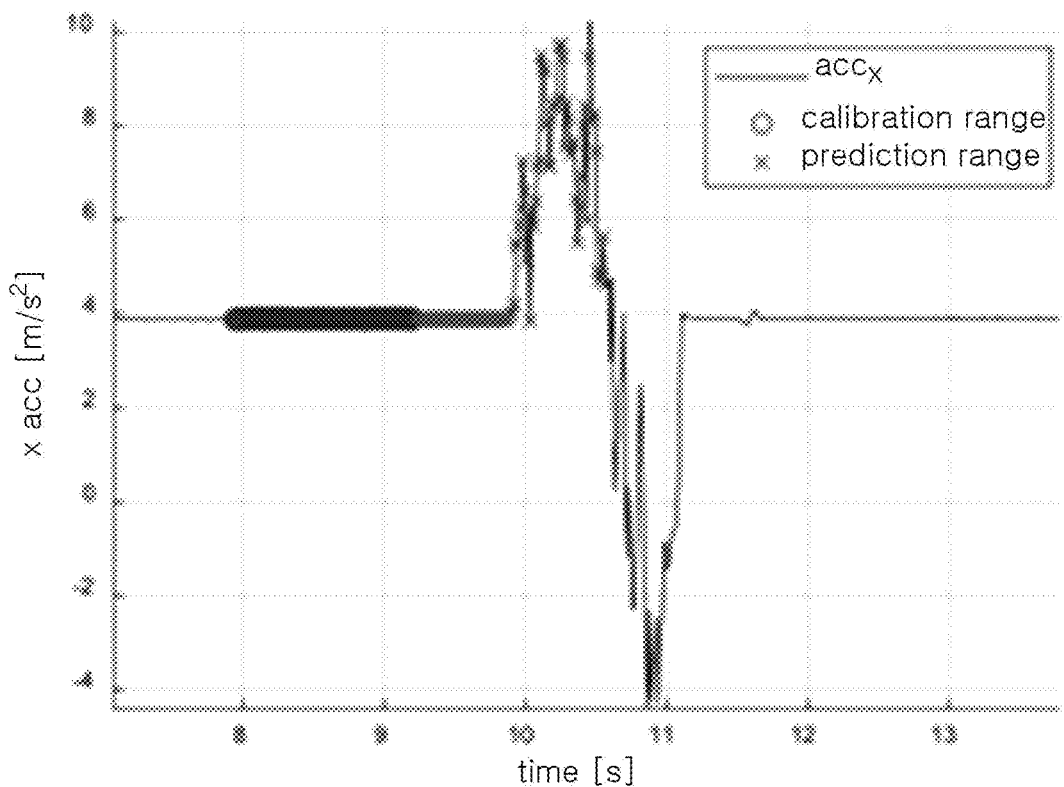

APPARATUS AND METHOD FOR ESTIMATING VEHICLE PITCH RELATIVE TO ROAD

CROSS-REFERENCE TO RELATED APPLICATION

This application claims priority to and the benefit of Korean Patent Application No. 10-2022-0066017, filed on May 30, 2022, the disclosure of which is incorporated herein by reference in its entirety.

BACKGROUND

Field of the Invention

The present invention relates to an apparatus and method for estimating a vehicle pitch relative to a road.

Discussion of Related Art

Generally, head lamps are installed to emit light in a predetermined direction. When the light is emitted in the predetermined direction even when a height of a vehicle is changed, a case in which a sufficient field of view cannot be secured or a case in which a driver in an oncoming vehicle is blinded occurs.

Methods of detecting a change in height of such a vehicle body and adjusting an emission angle of a head lamp on the basis of a detected value have been proposed, and in this case, the change in height of the vehicle body is detected using a vehicle height sensor.

However, since the calculation of a vehicle pitch using the vehicle height sensor is performed on the basis of a height difference between the vehicle body and a suspension of the vehicle, there is a difference between a calculated vehicle pitch and an actual vehicle pitch, and in a case in which one vehicle height sensor is used, there is a problem that a difference between the calculated slope and the actual slope becomes larger.

SUMMARY OF THE INVENTION

The present invention is directed to providing an apparatus and method for estimating a vehicle pitch relative to a road.

Objectives to be achieved by the present invention are not limited to the above-described objectives and may include objectives and effects which will be recognized through the summary of the invention and the embodiments described below.

According to an aspect of the present invention, there is provided an apparatus for measuring a vehicle pitch relative to a road, the apparatus including a wheel speed sensor part which obtains wheel speed data, an inertial measurement unit (IMU) sensor part which obtains IMU data, a preprocessing part which extracts a stop section and a moving section on the basis of the wheel speed data and the IMU data, and a slope estimation part which estimates a vehicle pitch in the stop section and a road slope in the moving section and estimates a vehicle pitch relative to a road on the basis of the vehicle pitch and the road slope.

The preprocessing part may include a first preprocessing part which compares the IMU data and a predetermined threshold to check whether the IMU data is valid data according to a result of the comparison and a second preprocessing part which extracts the stop section and the moving section on the basis of acceleration data of the IMU data and the wheel speed data when the IMU data is valid data.

The moving section may include an acceleration section and a deceleration section, and the second preprocessing part may extract the stop section and the acceleration section or the deceleration section and the stop section as a pair.

The second preprocessing part may calculate an average value of biases of the IMU sensor part in the stop section and subtract and remove the calculated average value of the bias from rotation rate data of the IMU data.

The slope estimation part may estimate the vehicle pitch on the basis of acceleration data of the IMU data in the stop section.

The slope estimation part may receive a speed at each predetermined time in the moving section, extract a section in which the speed is greater than or equal to a predetermined speed as a region of interest on the basis of the received speed, calculate a plurality of road slopes on the basis of the speed at each point in the region of interest, and finally estimate an average value of the plurality of calculated road slopes as the road slope in the moving section.

The slope estimation part may estimate the road slope on the basis of a speed in at least a partial section of the moving section.

The slope estimation part may receive a position at each predetermined time in the moving section and finally estimate the road slope in the moving section on the basis of positions at a start point and an end point in the moving section.

The slope estimation part may estimate the road slope on the basis of a position in at least a partial section of the moving section.

The slope estimation part may fit a virtual line to a shape of a road to calculate the magnitude of an error on the basis of the virtual line and a position of a vehicle, compare the calculated magnitude of the error and a predetermined threshold to evaluate the linearity of the road, and estimate the vehicle pitch relative to a road according to a result of the evaluation when the linearity of the road is appropriate.

According to another aspect of the present invention, there is provided a method of measuring a vehicle pitch relative to a road, the method including an operation of obtaining wheel speed data and inertial measurement unit (IMU) data, a preprocessing operation of extracting a stop section and a moving section on the basis of the wheel speed data and the IMU data, a first estimation operation of estimating a vehicle pitch in the stop section, a second estimation operation of estimating a road slope in the moving section, and a third estimation operation of estimating a vehicle pitch relative to a road on the basis of the vehicle pitch and the road slope.

The preprocessing operation may include a first preprocessing operation of comparing the IMU data and a predetermined threshold to check whether the IMU data is valid data according to a result of the comparing and a second preprocessing operation of extracting the stop section and the moving section on the basis of acceleration data of the IMU data and the wheel speed data when the IMU data is valid data.

The moving section may include an acceleration section or a deceleration section, and the second preprocessing operation may include extracting the stop section and the acceleration section or the deceleration section and the stop section as a pair.

The second preprocessing operation may include calculating an average value of biases of an IMU sensor part in the stop section and subtracting and removing the calculated average value of the bias from rotation rate data of the IMU data.

The first estimation operation may include estimating the vehicle pitch on the basis of acceleration data of the IMU data in the stop section.

The second estimation operation may include receiving a speed at each predetermined time in the moving section, extracting a section in which the speed is greater than or equal to a predetermined speed as a region of interest on the basis of the received speed, and calculating a plurality of road slopes on the basis of the speed at each point in the region of interest to finally estimate an average value of the plurality of calculated road slopes as the road slope in the moving section.

The second estimation operation may include estimating the road slope on the basis of a speed in at least a partial section of the moving section.

The second estimation operation may include receiving a position at each predetermined time in the moving section and finally estimating the road slope in the moving section on the basis of positions at a start point and an end point in the moving section.

The second estimation operation may include estimating the road slope on the basis of a position in at least a partial section of the moving section.

The third estimation operation may include fitting a virtual line to a shape of a road to calculate the magnitude of an error on the basis of the virtual line and a position of a vehicle and comparing the calculated magnitude of the error and a predetermined threshold to evaluate the linearity of the road and estimate the vehicle pitch relative to a road when the linearity of the road is appropriate according to a result of the evaluation.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 is a view illustrating a method of estimating a vehicle pitch relative to a road;

FIGS. 5A to 5D are graphs for showing a process of extracting a road slope estimation section illustrated in FIG. 4;

DETAILED DESCRIPTION OF EXEMPLARY EMBODIMENTS

Hereinafter, exemplary embodiments of the present invention will be described in detail with reference to the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings generally understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms, and in a case in which "at least one (or one or more) among A, B, and C" is described, this may include at least one of all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Figure 1:
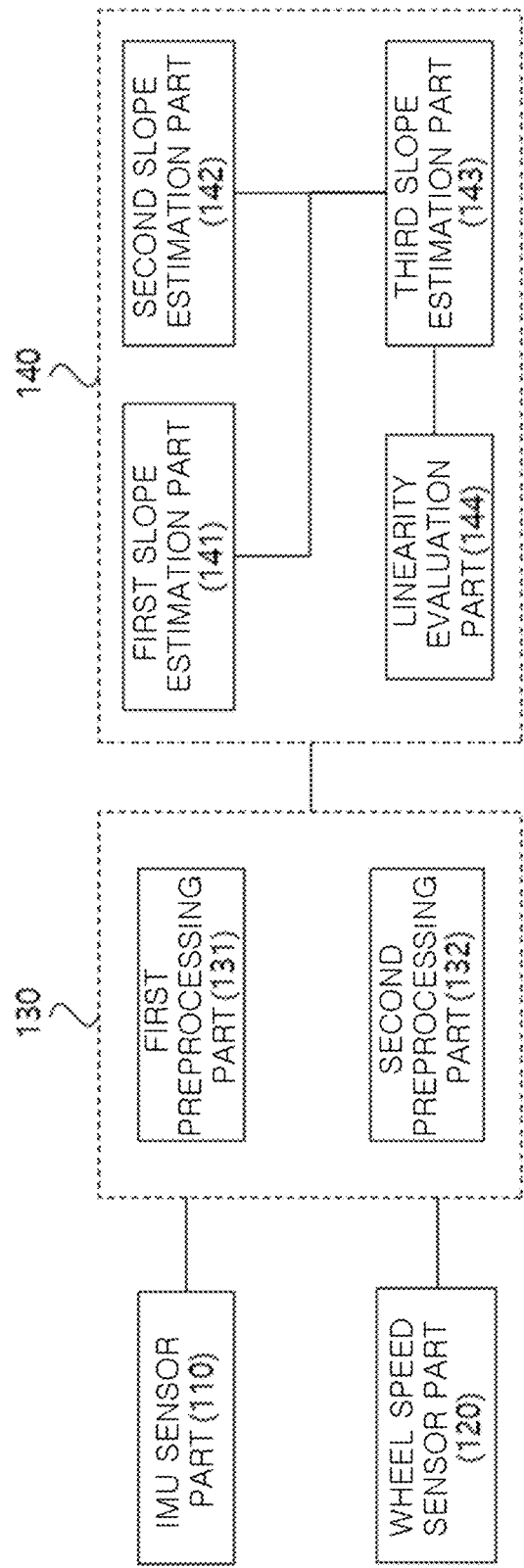
FIG. 1 is a view illustrating an apparatus for estimating a vehicle pitch relative to a road according to an embodiment.
Figure 2A:
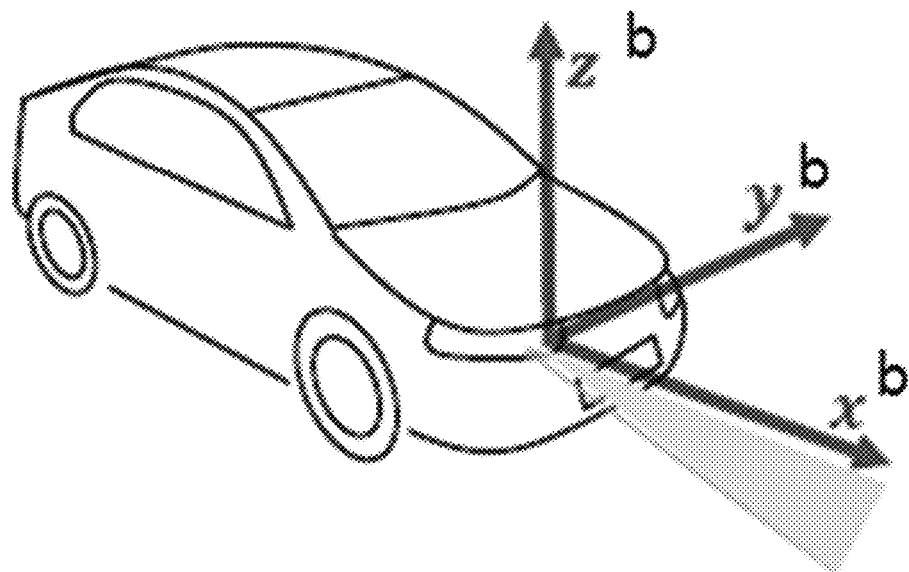
FIGS. 2A to 2C are views for describing a coordinate system according to an embodiment.
Figure 2B:
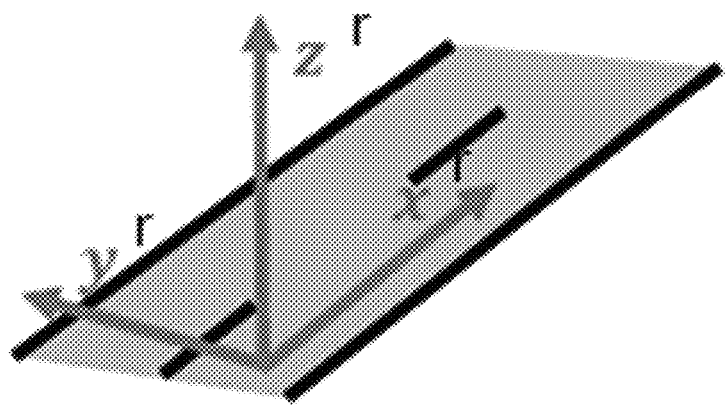
Figure 2C:
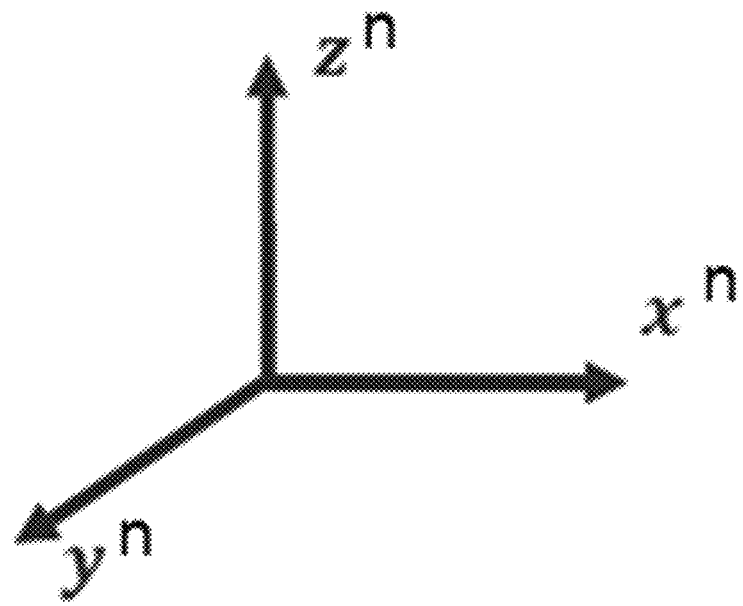
Figure 3:
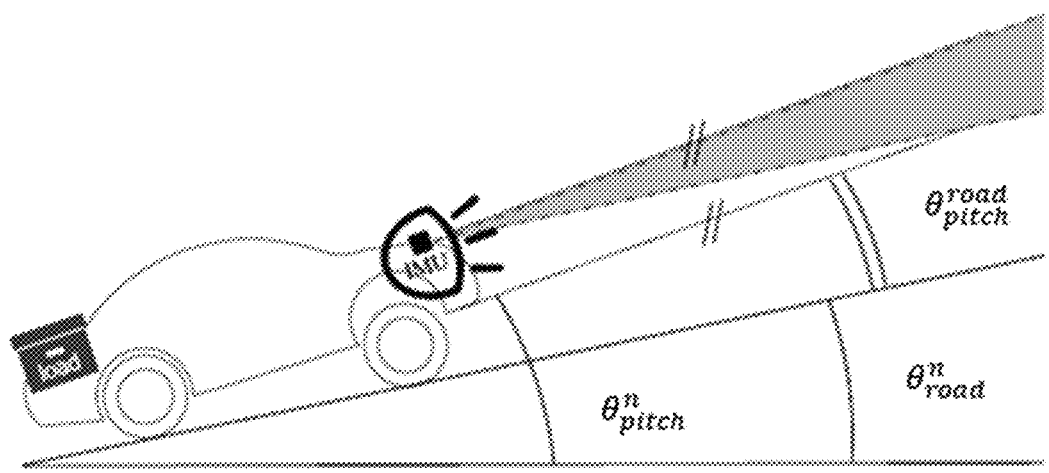
FIG. 3 is a view for describing a vehicle pitch, a road slope, and a vehicle pitch relative to a road.

FIG. 1 is a view illustrating an apparatus for estimating a vehicle pitch relative to a road according to an embodiment, FIGS. 2A to 2C are views for describing a coordinate system according to an embodiment, and FIG. 3 is a view for describing a vehicle pitch, a road slope, and a vehicle pitch relative to a road;

Referring to FIG. 1, an apparatus for estimating a vehicle pitch relative to a road according to the embodiment may include an inertial measurement unit (IMU) sensor part 110, a wheel speed sensor part 120, a preprocessing part 130, and a slope estimation part 140.

The IMU sensor part 110 may obtain data about the movement of a vehicle such as an acceleration and a rotation rate, that is, IMU data. The acceleration may include x-, y-, and z-axis accelerations and the gravitational force on a body frame, and the rotation rate may include x-, y-, and z-axis rotation rates on the body frame.

In this case, the body frame of FIG. 2A is a vehicle reference coordinate system which moves along with the movement of the vehicle, a road frame of FIG. 2B is a road reference coordinate system that changes according to a road slope, and a navigation frame of FIG. 2C is a coordinate system that does not change based on a reference point regardless of the movement of the vehicle.

Main variables using such frames may be expressed as parameter$_{axis\ time}^{frame}$.

The IMU sensor part 110 may include a gyroscope sensor and an acceleration sensor. First, the acceleration sensor may measure an acceleration and the gravitational force on the body frame. Three-axis accelerations and the gravitational force on the body frame may be measured by the IMU sensor part 110. In addition, the gyroscope sensor may measure a rotation rate on the body frame. Since vertical movement of the vehicle should be considered, pitch movement of the vehicle should be measured. Accordingly, a single y-axis gyroscope may be used, but the pitch movement of the vehicle may be measured even without using the single y-axis gyroscope, however, performance may be degraded.

The speed sensor part 120 may obtain wheel speed data through a controller area network (CAN). In this case, the wheel speed data may be obtained by averaging speeds of two rear wheels instead of a driving wheel but is not necessarily limited thereto.

The preprocessing part 130 may preprocess the IMU data obtained from the IMU sensor part 110 and the wheel speed data obtained from the wheel speed sensor part 120. The preprocessing part 130 may include a first preprocessing part 131 and a second preprocessing part 132.

The first preprocessing part 131 may check whether the IMU data is valid data. For example, the first preprocessing part 131 may determine that the IMU data is valid data when the IMU data is greater than or equal to a predetermined threshold and determine that the IMU data is invalid data when the IMU data is smaller than the predetermined threshold.

The second preprocessing part 132 may extract a stop section and a moving section on the basis of the IMU data and the wheel speed data. The stop section is a section in which the vehicle is in a stop state and the wheel speed data indicates zero. The moving section may be a section in which the vehicle decelerates or accelerates.

The first preprocessing part 131 may remove an IMU error from the IMU data. There are two types of IMU errors such as bias and zero mean white noise. Such errors may cause a big problem when an acceleration and a rotation rate are integrated. When the vehicle stops, an output of a gyroscope has only a bias and noise.

In the embodiment, the quality of the IMU data is improved by removing the bias of the gyroscope, and a bias is estimated through an average value to remove the zero mean white noise.

The slope estimation part 140 may estimate a vehicle pitch relative to a road on the basis of the preprocessed IMU data and wheel speed data. The slope estimation part 140 may include a first slope estimation part 141, a second slope estimation part 142, a third slope estimation part 143, and a linearity evaluation part 144.

The first slope estimation part 141 may estimate a vehicle pitch in the stop state. The first slope estimation part 141 may estimate a vehicle pitch in the stop section extracted by the second preprocessing part 132.

The second slope estimation part 142 may estimate a road slope in a moving state. The second slope estimation part 142 may estimate the road slope in the moving section extracted by the second preprocessing part 132.

The third slope estimation part 143 may estimate a vehicle pitch relative to a road on the basis of the estimated vehicle pitch in the stop section and the road slope in the moving section. For example, as illustrated in FIG. 3, the third slope estimation part 143 road may estimate the vehicle pitch relative to a road of $\theta_{pitch}^{road}$ by subtracting the road slope of $\theta_{road}^{n}$ from the vehicle pitch of $\theta_{pitch}^{n}$.

The linearity evaluation part 144 may evaluate the linearity of the road in order to calculate the road slope. For example, when it is evaluated that the linearity of the road is suitable, an estimation process may be performed, and the third slope estimation part 143 may estimate the vehicle pitch relative to a road.

Figure 5A:
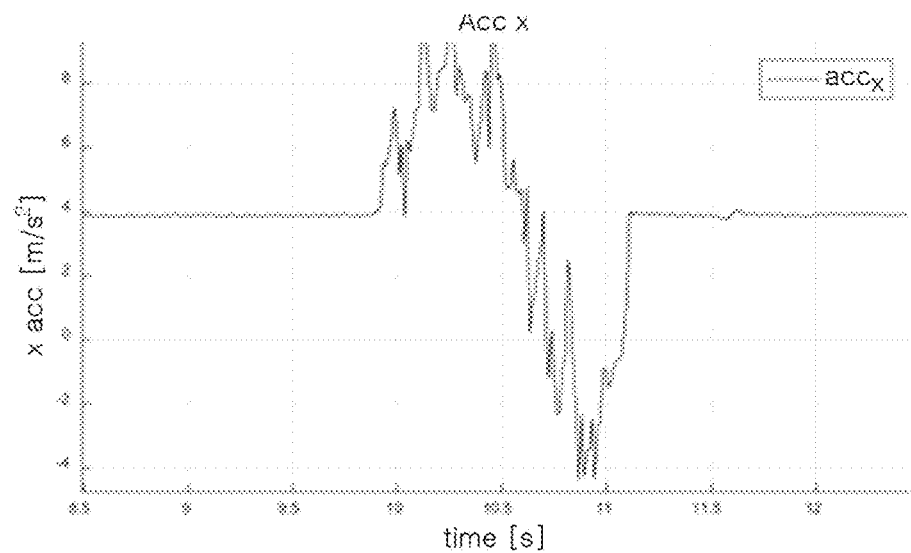
Figure 5B:
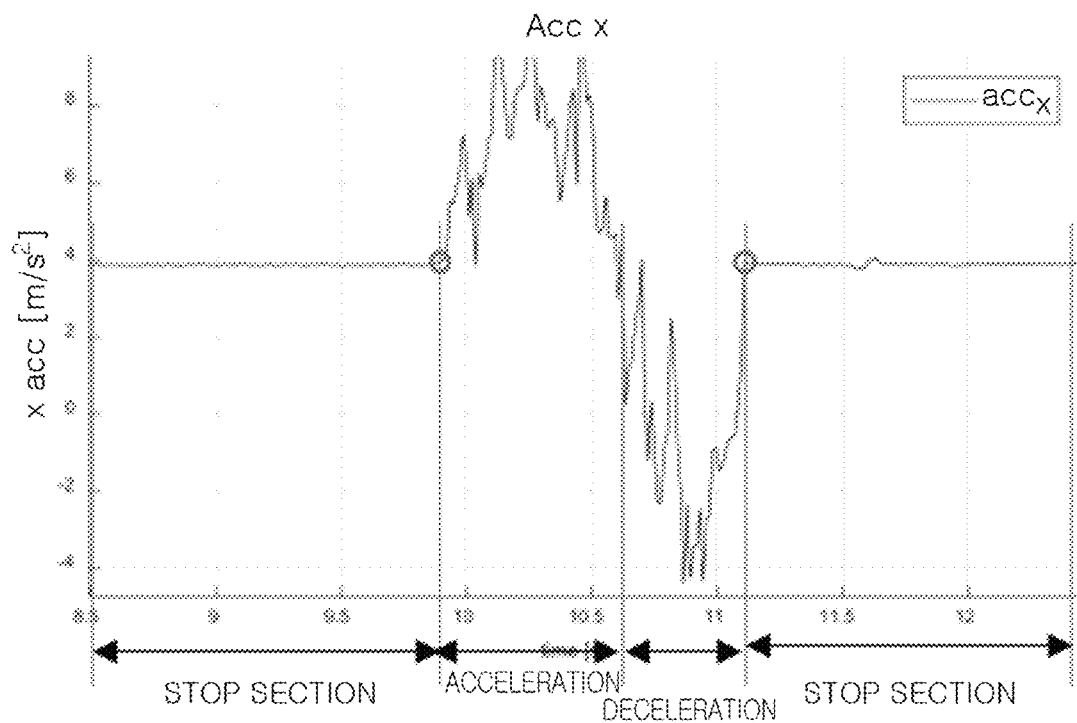
Figure 5D:
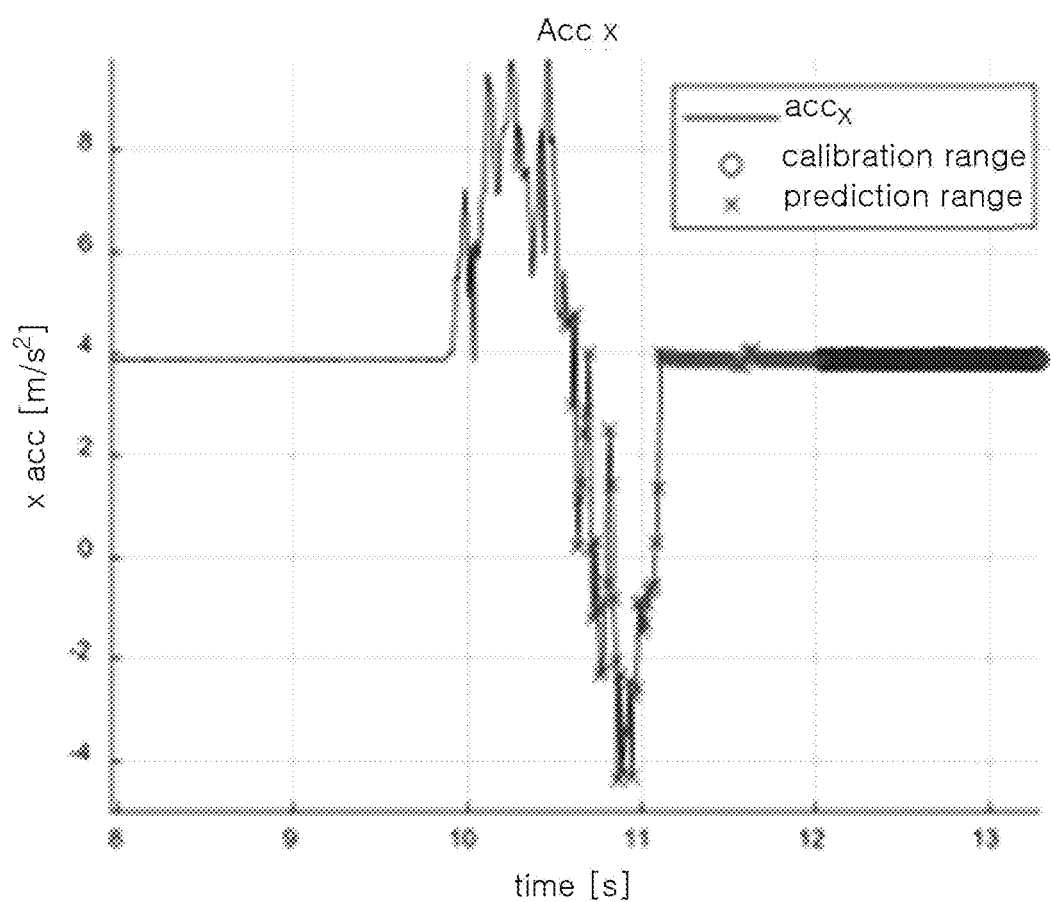
Figure 6:
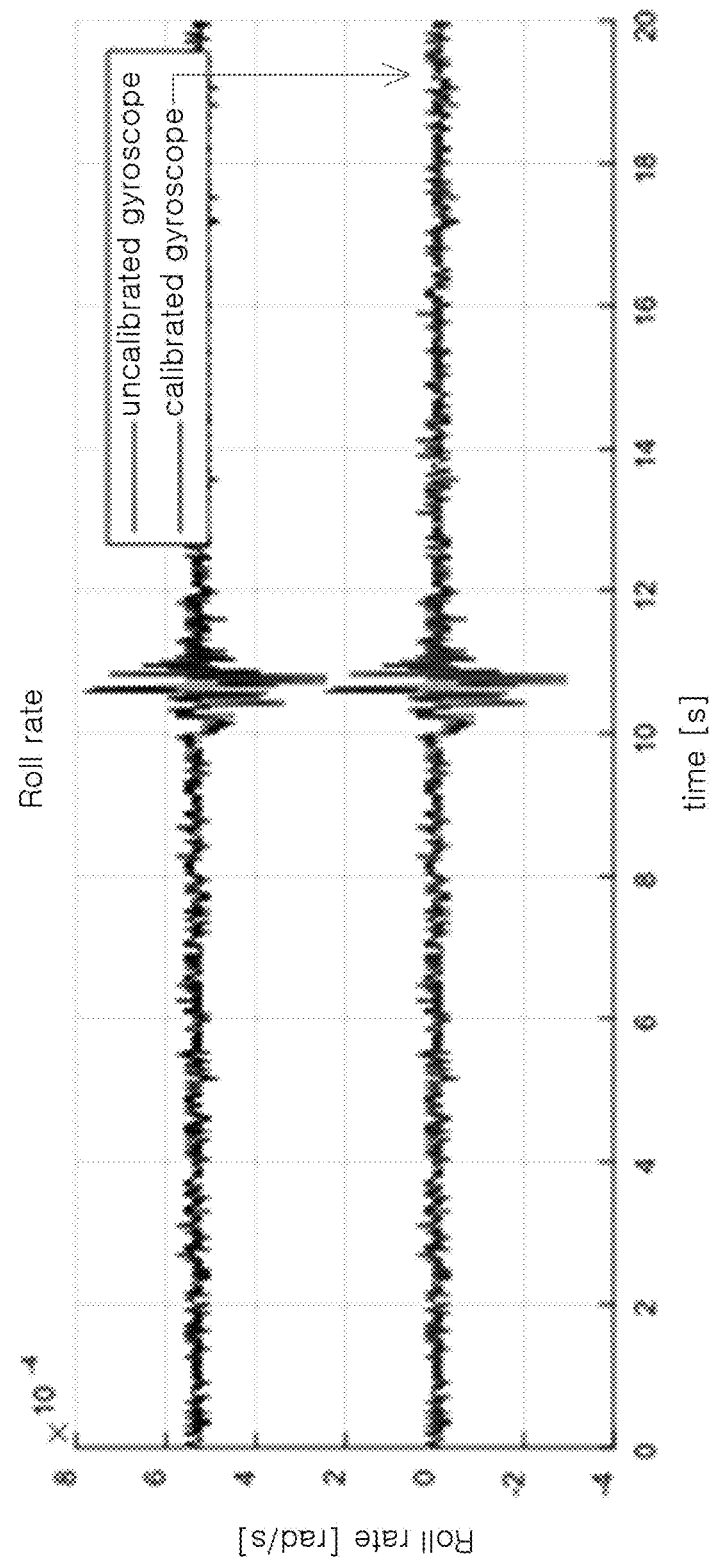
FIG. 6 is a view for describing a principle of removing a bias illustrated in FIG. 4.
Figure 7:
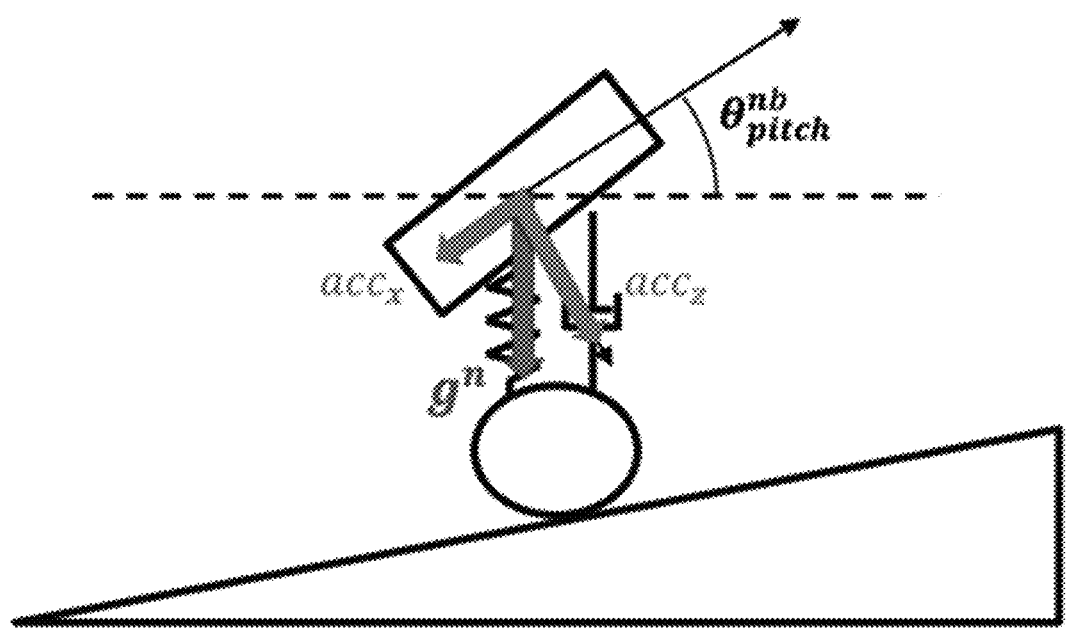
FIG. 7 is a view for describing a principle of estimating a vehicle pitch illustrated in FIG. 4.

FIG. 4 is a view illustrating a method of estimating a vehicle pitch relative to a road, FIGS. 5A to 5D are graphs for showing a process of extracting a road slope estimation section illustrated in FIG. 4, FIG. 6 is a view for describing a principle of removing a bias illustrated in FIG. 4, and FIG. 7 is a view for describing a principle of estimating a vehicle pitch illustrated in FIG. 4.

Referring to FIG. 4, an apparatus for estimating a vehicle pitch relative to a road according to the embodiment (hereinafter, referred to as a slope estimation apparatus) may receive IMU data and wheel speed data (S110).

Then, the slope estimation apparatus may check whether the received IMU data is valid data (S120). In this case, the slope measurement apparatus may check the IMU data is valid data on the basis of predetermined parameters. The predetermined parameters may include an acceleration, a steering angle, and a road slope.

For example, the slope estimation apparatus may determine that the IMU data and the wheel speed data are invalid data and stop a slope estimation process on the basis of the IMU data and the wheel speed data when an acceleration of the vehicle is lower than or equal to a predetermined acceleration, a steering angle of the vehicle is greater than or equal to a predetermined steering angle, a road slope at which the vehicle is positioned is greater than or equal to a predetermined road slope (in a pitch direction) or a predetermined road slope (in a roll direction).

The reason why the above is taken into account is that an acceleration due to sudden acceleration is mostly noise due to movement of a suspension, a steering angle causes a change in Y-axis acceleration, and a road slope greater than or equal to a predetermined angle causes a static change in vehicle pitch relative to a road due to a load.

Then, the slope estimation apparatus may extract a road slope estimation section on the basis of the received IMU data and wheel speed data (S130). In this case, the road slope estimation section may include a stop-acceleration section in which the vehicle accelerates after stopping and a deceleration-stop section in which the vehicle stops after decelerating. According to the embodiment, since an acceleration state after stopping or a stop state after traveling or decelerating is determined in the road slope estimation section, IMU acceleration data of the IMU data is used.

Specifically, the slope estimation apparatus may receive the IMU acceleration data as in FIG. 5A and filter the received IMU acceleration data so as to extract IMU acceleration data having a value greater than or equal to a predetermined value.

The slope estimation apparatus may distinguish a stop section, an acceleration section, and a deceleration section on the basis of the filtered IMU acceleration data and wheel speed data as in FIG. 5B.

In this case, in the stop section and the acceleration section or in the deceleration section and the stop section, a section in which a value of an acceleration is greater than or equal to a predetermined value may be determined as a moving section that includes the acceleration section and the deceleration section.

As in FIGS. 5C and 5D, the slope estimation apparatus may extract the stop-acceleration section or deceleration-stop section as the road slope estimation section on the basis of the distinguished stop section, acceleration section, and deceleration section.

In the embodiment, a vehicle pitch relative to a road will be estimated using the IMU data and the wheel speed data in the deceleration-stop section or stop-acceleration section as described above.

Then, the slope estimation apparatus may remove a bias by calculating an average value of the bias in the stop section and subtracting the calculated average value of the bias from the IMU data, that is, IMU rotation rate data (S140).

As in FIG. 6, it is shown that, since an output value of a gyrometer, that is, the IMU rotation rate data, is large because a bias is included, the output value is decreased by subtracting the average value of the bias therefrom.

Then, the slope estimation apparatus may estimate a static vehicle pitch, that is, a pitch and a roll, on the basis of IMU data, that is, the IMU acceleration data in the stop section (S150). In this case, as in FIG. 7, the static vehicle pitch in the stop section is estimated on the basis of a position of the gravitational force gn, and the static vehicle pitch is defined as in Equation 1 and Equation 2.

$$\theta_{pitch}^n = a\tan\left(\frac{\text{mean}(acc_z^b)_{stop}}{\text{mean}(acc_x^b)_{stop}/\sin(\theta_{roll}^n)}\right) \quad [\text{Equation 1}]$$

$$\theta_{roll}^n = a\tan\left(\frac{\text{mean}(acc_y^b)_{stop}}{\text{mean}(acc_x^b)_{stop}}\right) \quad [\text{Equation 2}]$$

Here, $acc_z^b$, $acc_y^b$, and $acc_x^b$ denote z-, y-, and x-axis accelerations on the body frame. In the embodiment, a pitch of a vehicle in Equation 3 is defined as a vehicle pitch.

Then, the slope estimation apparatus may estimate a road slope on the basis of the IMU data (S160). The road slope may be calculated on the basis of an acceleration, a speed, and a position, and the road slope may be defined as in Equation 3, Equation 4, and Equation 5.

$$\theta_{road}^n = \frac{1}{N}\sum_1^N a\tan\left(\frac{a_z^n}{\sqrt{(a_x^n)^2 + (a_y^n)^2}}\right) \quad [\text{Equation 3}]$$

Here, $a_z^b$, $a_y^b$, and $a_x^b$ and denote z-, y-, and x-axis accelerations on the navigation frame. $a_z^n$, $a_y^n$, and $a_x^n$ and may be calculated by rotationally transforming $acc_z^b$, $acc_y^b$, and $acc_x^b$.

$$\theta_{road}^n = \frac{1}{N}\sum_1^N a\tan\left(\frac{v_z^n}{\sqrt{(v_x^n)^2 + (v_y^n)^2}}\right) \quad [\text{Equation 4}]$$

$$\theta_{road}^n = a\tan\left(\frac{\Delta p_z^n}{\sqrt{(\Delta p_x^n)^2 + (\Delta p_y^n)^2}}\right) \quad [\text{Equation 5}]$$

In this case, relationships between an acceleration, a speed, and a position are defined as in Equation 6 and Equation 7 below.

$$\int a_x^n dt = v_x^n, \int a_y^n dt = v_y^n, \int a_z^n dt = v_z^n \quad [\text{Equation 6}]$$

Here, $v_z^b$, $v_y^b$, and $v_x^b$ denote z-, y-, and x-axis speeds on the navigation frame.

$$\int v_x^n dt = p_x^n, \int v_y^n dt = p_y^n, \int v_z^n dt = p_z^n \quad [\text{Equation 7}]$$

Here, $p_z^b$, $p_y^b$, and $p_x^b$ denote z-, y-, and x-axis speeds on the navigation frame.

Figure 8A:
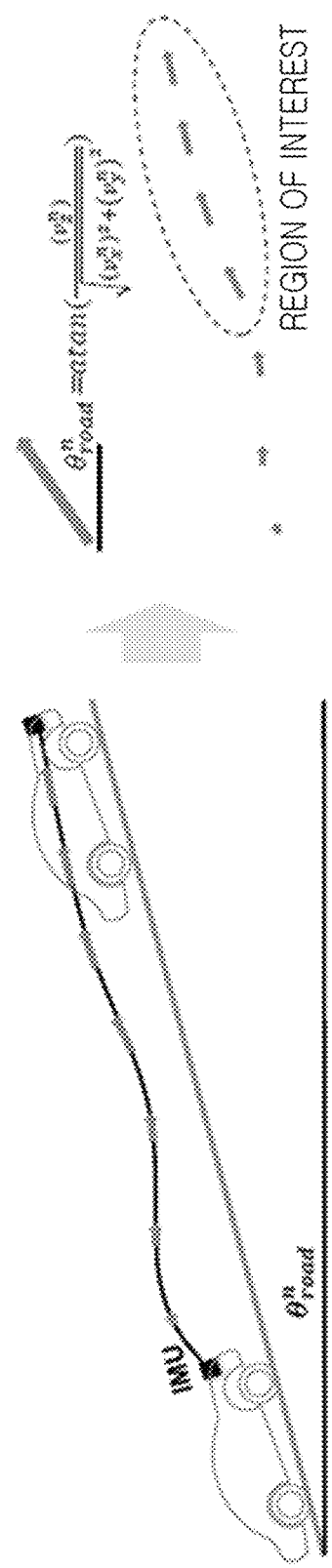
FIGS. 8A and 8B are views for describing a principle of calculating a road slope on the basis of a speed according to an embodiment.
Figure 8B:
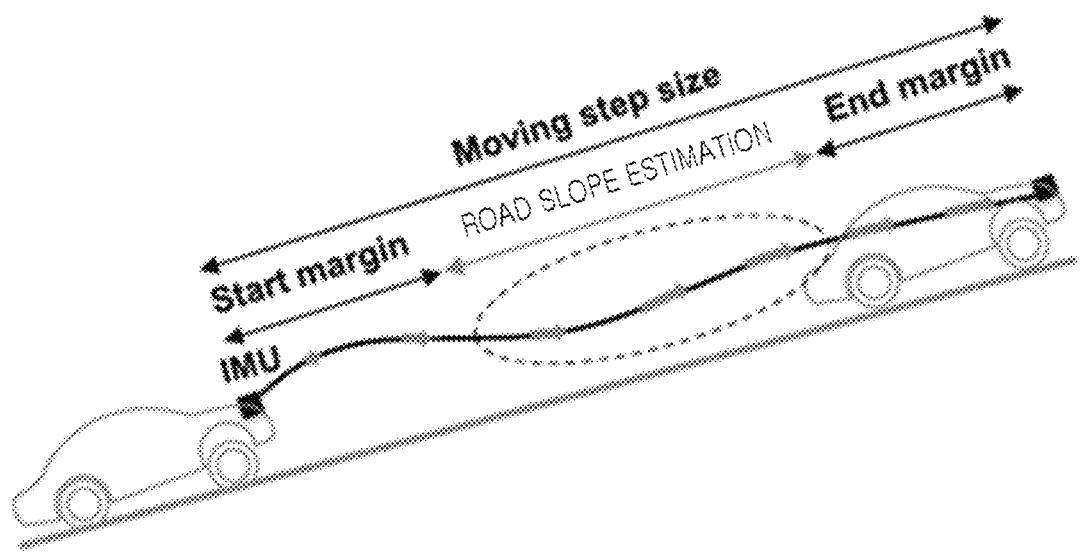

FIGS. 8A and 8B are views for describing a principle of calculating a road slope on the basis of a speed according to the embodiment.

Referring to FIG. 8A, the slope estimation apparatus may receive a speed at each predetermined time in the moving section and extract a section in which the speed is greater than or equal to a predetermined speed as a region of interest on the basis of the received speed.

The slope estimation apparatus may calculate a plurality of first road slopes on the basis of a speed of each point.

The slope estimation apparatus may average the plurality of first road slopes to calculate one second road slope, and the second road slope is calculated as a final road slope.

Referring to FIG. 8B, in the embodiment, a road slope is calculated in a partial moving section instead of an entire moving section in consideration of a start margin and an end margin for a speed.

For example, a road slope is calculated on the basis of a speed in a remaining section excluding a partial moving section of a starting section and a partial moving section of a finishing section among an entire moving section.

Figure 9A:
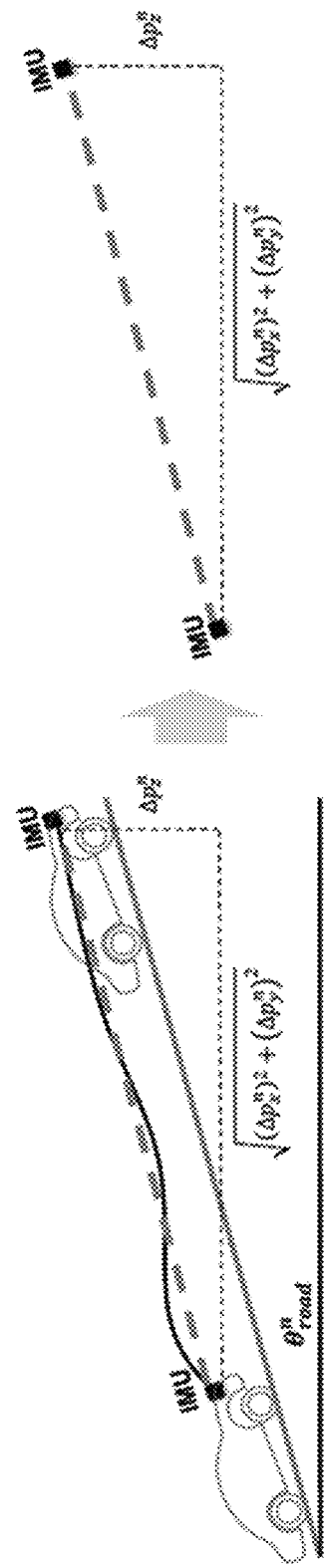
FIGS. 9A and 9B are views for describing a principle of estimating a road slope on the basis of a position according to an embodiment.
Figure 9B:
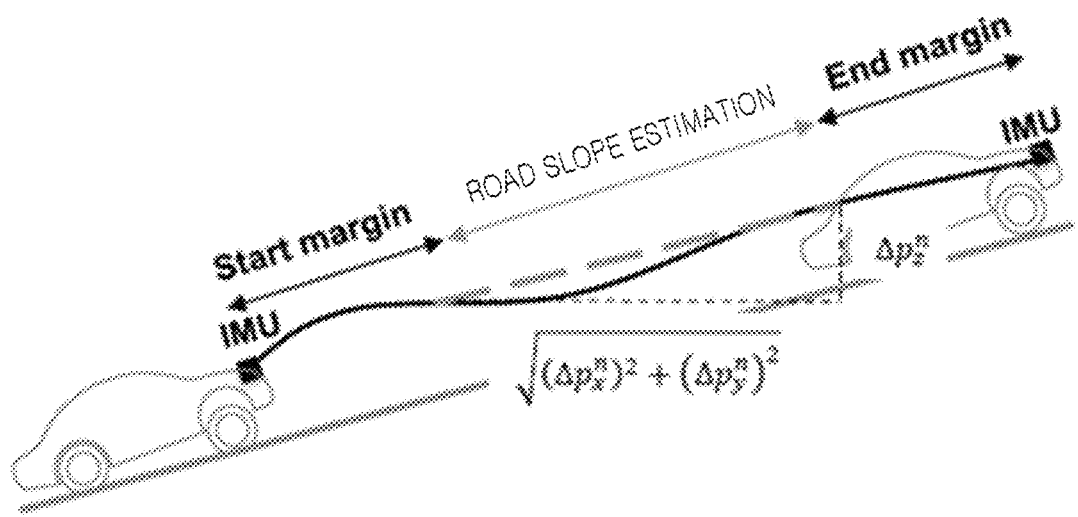

FIGS. 9A and 9B are views for describing a principle of estimating a road slope on the basis of a position according to the embodiment.

Referring to FIG. 9A, the slope estimation apparatus receives a position at each predetermined time in the moving section and calculates a road slope on the basis of positions at a start point and an end point.

Referring to FIG. 9B, in the embodiment, a road slope is calculated only in a partial moving section instead of an entire moving section in consideration of a start margin and an end margin of a position.

For example, a road slope will be calculated on the basis of a position received in a remaining section excluding a partial moving section of a starting section and a partial moving section of a finishing section among an entire moving section.

In this case, the start margin and the end margin may be set as a start margin ratio and an end margin ratio. In this case, an example in consideration of both the start margin and the end margin is described, but the present invention is not necessarily limited thereto, and at least one of the start margin and the end margin may be considered.

In addition, the start margin and the end margin may have the same margin ratio, but are not necessarily limited thereto, and may have different margin ratios according to situations. For example, in a section in which the vehicle accelerates after stopping, a start margin ratio may be set to be greater than an end margin ratio, and in a section in which the vehicle stops after decelerating, an end margin ratio may be set to be greater than a start margin ratio.

Then, the slope estimation apparatus may evaluate the linearity of the road (S170).

Figure 10:
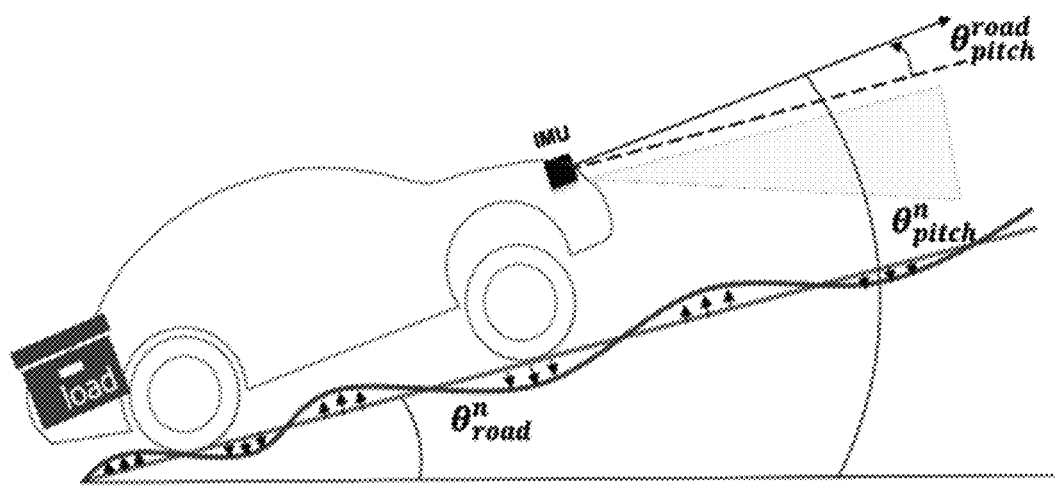
FIG. 10 is a view for describing a principle of evaluating the linearity of the road illustrated in FIG. 4.

FIG. 10 is a view for describing a principle of evaluating the linearity of the road illustrated in FIG. 4.

Referring to FIG. 10, the slope estimation apparatus may fit a virtual line to a shape of a road, calculate the magnitude of an error on the basis of the virtual line and a position of the vehicle, and evaluate the linearity of the road on the basis of the calculated magnitude of the error.

For example, when the magnitude of the error is greater than or equal to a predetermined threshold, the slope estimation apparatus determines that the road is severely irregular and does not have appropriate linearity for calculating a road slope, does not estimate a vehicle pitch relative to a road, and stops an estimation process.

However, when the magnitude of the error is smaller than the predetermined threshold, the slope estimation apparatus may determine that the irregularity of the road is not severe and the linearity of the road is suitable for calculating a road slope.

Then, when the slope estimation apparatus determines that the linearity of the road is appropriate, the slope estimation apparatus may estimate a vehicle pitch relative to a road on the basis of the estimated vehicle pitch and road slope (S180). The vehicle pitch relative to a road is defined as in Equation 8.

$$\theta_{pitch}^{road} = \theta_{pitch}^{n} - \theta_{road}^{n} \qquad \text{[Equation 8]}$$

According to embodiments, a vehicle pitch relative to a road can be accurately estimated by extracting a stop section and a moving section on the basis of wheel speed data and inertial measurement unit (IMU) data, estimating a vehicle pitch in the stop section and a road slope in the moving section, and estimating a vehicle pitch relative to a road on the basis of the vehicle pitch and the road slope.

Various useful advantages and effects of the present invention are not limited to the above-described content and will be more easily understood in the above detailed description of the specific embodiments of the present invention.

Terms such as "unit" used in the present embodiment refer to software or a hardware component such as a field-programmable gate array (FPGA) or an application-specific integrated circuit (ASIC), and objects termed "unit" perform certain roles. However, the term "unit" is not limited to software or hardware. A "unit" may be configured to reside on an addressable storage medium or to reproduce one or more processors. Thus, in an example, the term "unit" includes components such as software components, object-oriented software components, class components, task components, processes, functions, properties, procedures, sub-routines, segments of program code, drivers, firmware, micro-code, circuits, data, data bases, data structures, tables, arrays, and variables. Functions provided by these components and "units" may be combined into a smaller number of components and "units" or may be subdivided into additional components and "units." Furthermore, the components and "units" may also be implemented to reproduce one or more central processing units (CPUs) within a device or a security multimedia card.

While the present invention has been described above with reference to exemplary embodiments, it may be understood by those skilled in the art that various modifications and changes of the present invention may be made within a range not departing from the spirit and scope of the present invention defined by the appended claims.

What is claimed is:

1. An apparatus for estimating a vehicle pitch relative to a road, the apparatus comprising:
   a wheel speed sensor part adapted to obtain wheel speed data;
   an inertial measurement unit (IMU) sensor part adapted to obtain IMU data;
   a preprocessing part adapted to extract a stop section and a moving section based on the wheel speed data and the IMU data; and
   a slope estimation part adapted to estimate a vehicle pitch in the stop section and a road slope in the moving section and estimate a vehicle pitch relative to a road based on the vehicle pitch and the road slope; wherein the slope estimation part is adapted to:
      receive a speed at each predetermined time in the moving section;
      extract a section in which the speed is greater than or equal to a predetermined speed as a region of interest based on the received speed; and
      calculate a plurality of road slopes on the basis of the speed at each point in the region of interest;
      estimate an average value of the plurality of calculated road slopes as the road slope in the moving section; and
      adjust an emission angle of a head lamp based on the estimated vehicle pitch relative to the road.

2. The apparatus of claim 1, wherein the preprocessing part includes:
   a first preprocessing part adapted to compare the IMU data and a predetermined threshold to determine whether the IMU data is valid data according to a result of the comparison; and
   a second preprocessing part adapted to extract the stop section and the moving section based on acceleration data of the IMU data and the wheel speed data when the IMU data is valid data.

3. The apparatus of claim 2, wherein:
   the moving section includes an acceleration section or a deceleration section; and
   the second preprocessing part is adapted to extract the stop section and the acceleration section or the deceleration section and the stop section.

4. The apparatus of claim 2, wherein the second preprocessing part is adapted to:
   calculate an average value of biases of the IMU sensor part in the stop section; and
   subtract and remove the calculated average value of the bias from rotation rate data of the IMU data.

5. The apparatus of claim 1, wherein the slope estimation part is adapted to estimate the vehicle pitch based on acceleration data of the IMU data in the stop section.

6. The apparatus of claim 1, wherein the slope estimation part is adapted to estimate the road slope based on a speed in at least a partial section of the moving section.

7. The apparatus of claim 1, wherein the slope estimation part is adapted to:
   receive a position at each predetermined time in the moving section; and
   estimate the road slope in the moving section based on positions at a start point and an end point in the moving section.

8. The apparatus of claim 1, wherein the slope estimation part is adapted to estimate the road slope based on a position in at least a partial section of the moving section.

9. The apparatus of claim 1, wherein the slope estimation part is adapted to:
   fit a virtual line to a shape of a road to calculate a magnitude of an error based on the virtual line and a position of a vehicle;

compare the calculated magnitude of the error and a predetermined threshold to evaluate linearity of the road; and estimate the vehicle pitch relative to a road according to a result of the evaluation when the linearity of the road is appropriate.

10. A method of estimating a vehicle pitch relative to a road, the method comprising:
    an operation of obtaining wheel speed data and inertial measurement unit (IMU) data;
    a preprocessing operation of extracting a stop section and a moving section based on the wheel speed data and the IMU data;
    a first estimation operation of estimating a vehicle pitch in the stop section;
    a second estimation operation of estimating a road slope in the moving section, wherein the second estimation operation comprises:
        receiving a speed at each predetermined time in the moving section;
        extracting a section in which the speed is greater than or equal to a predetermined speed as a region of interest based on the received speed; and
        calculating a plurality of road slopes on the basis of the speed at each point in the region of interest to estimate an average value of the plurality of calculated road slopes as the road slope in the moving section;
    a third estimation operation of estimating a vehicle pitch relative to a road based on the vehicle pitch and the road slope; and
    an adjustment step of adjusting an emission angle of a head lamp based on the estimated vehicle pitch relative to the road.

11. The method of claim 10, wherein the preprocessing operation includes:
    a first preprocessing operation of comparing the IMU data and a predetermined threshold to determine whether the IMU data is valid data according to a result of the comparing; and
    a second preprocessing operation of extracting the stop section and the moving section based on acceleration data of the IMU data and the wheel speed data when the IMU data is valid data.

12. The method of claim 11, wherein:
    the moving section includes an acceleration section and a deceleration section; and
    the second preprocessing operation includes extracting the stop section and the acceleration section or the deceleration section and the stop section.

13. The method of claim 11, wherein the second preprocessing operation includes:
    calculating an average value of biases of an IMU sensor part in the stop section; and
    subtracting and removing the calculated average value of the bias from rotation rate data of the IMU data.

14. The method of claim 10, wherein the first estimation operation includes estimating the vehicle pitch based on acceleration data of the IMU data in the stop section.

15. The method of claim 10, wherein the second estimation operation includes estimating the road slope based on a speed in at least a partial section of the moving section.

16. The method of claim 10, wherein the second estimation operation includes:
    receiving a position at each predetermined time in the moving section; and
    estimating the road slope in the moving section based on positions at a start point and an end point in the moving section.

17. The method of claim 10, wherein the second estimation operation includes estimating the road slope based on a position in at least a partial section of the moving section.

18. The method of claim 10, wherein the third estimation operation includes:
    fitting a virtual line to a shape of a road to calculate a magnitude of an error based on the virtual line and a position of a vehicle; and
    comparing the calculated magnitude of the error and a predetermined threshold to evaluate linearity of the road and estimate the vehicle pitch relative to a road when the linearity of the road is appropriate according to a result of the evaluation.

* * * * *